(12) United States Patent
Ichikawa et al.

(10) Patent No.: US 10,211,434 B2
(45) Date of Patent: Feb. 19, 2019

(54) BATTERY PACK

(71) Applicants: YAZAKI CORPORATION, Tokyo (JP); DENSO CORPORATION, Kariya, Aichi-pref. (JP)

(72) Inventors: Yoshiaki Ichikawa, Kakegawa (JP); Katsunori Sato, Kakegawa (JP); Hidehiro Takasugi, Kakegawa (JP); Hirokuni Koike, Kakegawa (JP); Hisato Inoue, Kariya (JP); Hiroyoshi Yamamoto, Kariya (JP)

(73) Assignees: YAZAKI CORPORATION, Minato-ku, Tokyo (JP); DENSO CORPORATION, Aichi-pref (JP)

( * ) Notice: Subject to any disclaimer, the term of this patent is extended or adjusted under 35 U.S.C. 154(b) by 0 days.

(21) Appl. No.: 15/660,165

(22) Filed: Jul. 26, 2017

(65) Prior Publication Data

US 2018/0034014 A1 Feb. 1, 2018

(30) Foreign Application Priority Data

Jul. 29, 2016 (JP) ................. 2016-150736

(51) Int. Cl.
| | |
|---|---|
| *H01M 2/10* | (2006.01) |
| *H01M 2/12* | (2006.01) |
| *H01M 2/20* | (2006.01) |
| *B60L 11/18* | (2006.01) |
| *H01M 2/30* | (2006.01) |
| *H01M 10/04* | (2006.01) |

(52) U.S. Cl.
CPC ....... *H01M 2/1016* (2013.01); *B60L 11/1877* (2013.01); *B60L 11/1879* (2013.01); *H01M 2/1077* (2013.01); *H01M 2/12* (2013.01); *H01M 2/202* (2013.01); *H01M 2/206* (2013.01); *H01M 2/30* (2013.01); *H01M 10/0413* (2013.01)

(58) Field of Classification Search
None
See application file for complete search history.

(56) References Cited

U.S. PATENT DOCUMENTS

| | | | |
|---|---|---|---|
| 2012/0129041 A1 | 5/2012 | Komazawa | |
| 2015/0125720 A1* | 5/2015 | Fujii | H01M 2/1077 429/56 |

FOREIGN PATENT DOCUMENTS

JP    2012-109152 A    6/2012

* cited by examiner

*Primary Examiner* — Jonathan Crepeau
(74) *Attorney, Agent, or Firm* — Sughrue Mion, PLLC (57) ABSTRACT

Each battery module of a battery pack includes a stack of serially connected battery cells, a gas discharge duct extending in a cell arrangement direction to guide gas discharged from a relief valve of each battery cell to an outside of the battery module, the gas discharge duct having a first connection opening at one end and a second connection opening at the other end, a first connection terminal piece having an inner end portion electrically connected to an electrode of one of the battery cells at one end of the serial connection and an outer end portion disposed inside the first connection opening, and a second connection terminal piece having an inner end portion electrically connected to an electrode of another one of the battery cells at another end of the serial connection and an outer end portion disposed inside the second connection opening.

3 Claims, 8 Drawing Sheets

BATTERY PACK

CROSS-REFERENCE TO RELATED APPLICATION

The present application claims priority from Japanese Patent Application No. 2016-150736 filed on Jul. 29, 2016, the entire content of which is incorporated herein by reference.

FIELD OF INVENTION

The present invention relates to a battery pack having a combination of a plurality of battery modules.

RELATED ART

Batteries, such as nickel-hydrogen batteries and lithium-ion batteries, that are used as a power source for drive motors of electric vehicles and hybrid vehicles, have a battery module (assembled batteries) including battery cells that are electrically connected to each other in series or parallel using connection members such as bus bars to provide large electric power.

To provide larger electric power, a plurality of such battery modules may be further connected in series (see, e.g., JP2012-109152A).

Figure 8:
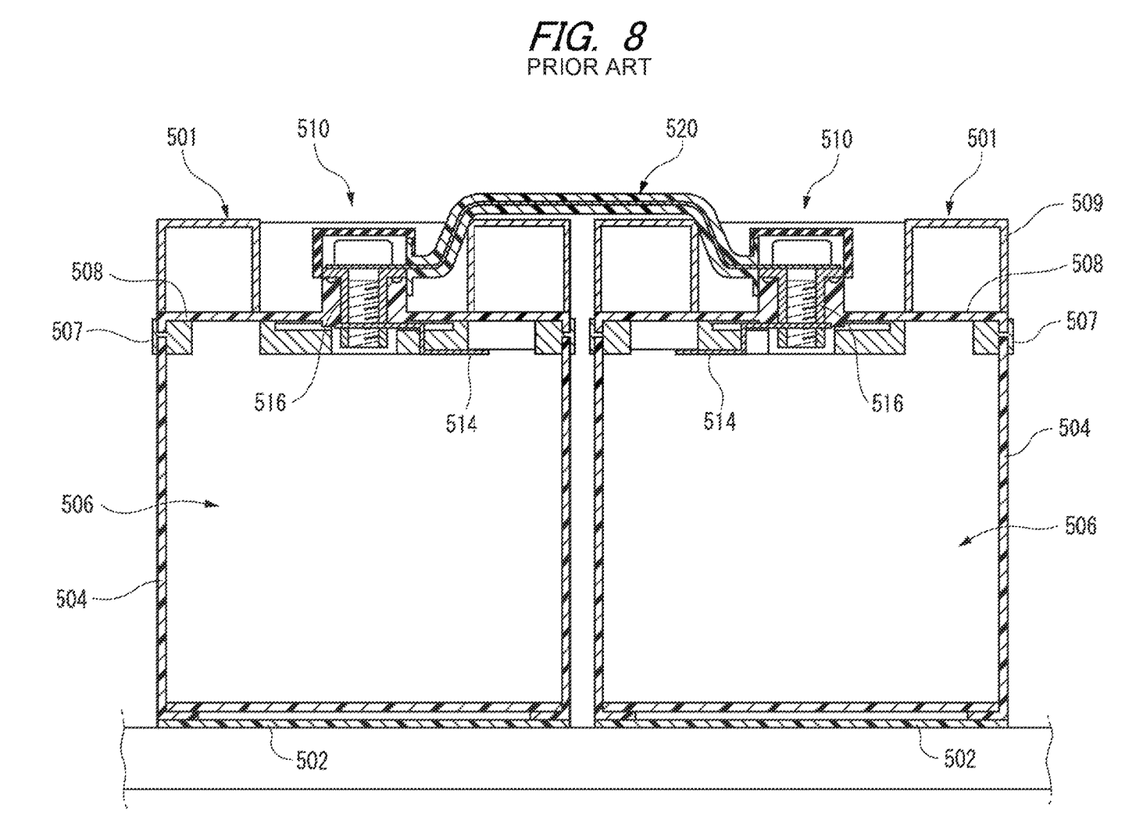
FIG. 8 is a sectional view illustrating related art battery modules 501 that are connected to each other.

FIG. 8 is a sectional view of two battery modules 501 that are connected to each other side by side, taken along the plane that includes inter-module connection portions 510 of the battery modules 501.

The battery module 501 is configured such that, in a cell holder 504 provided above a lower bracket 502 for supporting the whole of the battery module 501 at the lower section thereof, a plurality of unit cells (battery cells) 506 is separately stored so as not to make contact with each other. These unit cells 506 are connected in series using cell bus bars (connection members), not shown.

Bus bar plates 507 for preventing the cell bus bars from making contact with the unit cells 506 are provided above the unit cells 506. A bus bar cover 508 for protecting the upper section of the battery module 501 is provided above the bus bar plates 507, and an upper bracket 509 for covering the front and rear faces of the unit cells 506 and for securing the whole of the battery module 501 by screw fastening or a similar method to the lower bracket 502 is provided above the bus bar cover 508.

The inter-module connection portions 510, being used as a pair, are provided at both the ends of the bus bar cover 508 on the upper face of the battery module 501. The inter-module connection portions 510 are terminals in the battery module 501 and include a plus-terminal inter-module connection portion 510 connected to the positive terminal of the unit cell 506 via a cell-module bus bar 514 and a collar 516 and a minus-terminal inter-module connection portion 510 connected to the negative terminal of the unit cell 506 via the cell-module bus bar 514 and the collar 516.

Hence, the plurality of battery modules 501 can be connected in series by connecting the plus-terminal inter-module connection portion 510 of one battery module 501 to the minus-terminal inter-module connection portion 510 of the other battery module 501, whereby large electric power can be obtained.

The connection of the battery modules 501 provided side by side can be carried out by connecting both the ends of an inter-modular bus bar 520 to the inter-module connection portions 510 adjacent to each other.

A relief valve is provided on the upper face of each unit cell of this type of battery module in some cases. The relief valve is provided between the positive electrode terminal and the negative electrode terminal in the left-right direction of the unit cell, and is used to discharge the gas generated in the inside of the unit cell to the outside of the unit cell.

On the upper face of the battery module in which the plurality of unit cells is arranged in a line, a gas discharge duct extending in the arrangement direction is disposed. To cause the gas discharged from the relief valves of the unit cells to flow into the gas discharge duct and to move in a direction away from the battery module, the gas discharge duct is usually disposed at the central area of the upper face of the battery module.

However, in the case of the battery module 501 described above, since the inter-module connection portion 510 is provided at the central area of the upper face, the gas discharge duct provided so as to circumvent the inter-module connection portion 510, thereby causing a problem of increasing the sizes of components.

Furthermore, in the case of a battery pack in which a plurality of battery modules 501 is connected in series, the battery modules 501 are required to be electrically connected to each other using the inter-modular bus bars 520, and the gas discharge ducts are also required to be hermetically connected to each other, whereby the work for connecting the battery modules 501 becomes complicated, thereby increasing the manufacturing cost.

SUMMARY

Illustrative aspects of the present invention provide a battery pack having a plurality of battery modules that can be connected easily so that manufacturing cost is reduced.

According to an illustrative aspect of the present invention, a battery pack includes a combination of a plurality of battery modules. Each of the battery modules includes a stack of battery cells each having a relief valve, a gas discharge duct extending from a first end of the gas charge duct to a second end of the gas discharge duct in a direction in which the battery cells are arranged in the battery module to guide gas discharged from the relief valve of each battery cell to an outside of the battery module, the gas discharge duct having a first connection opening provided at the first end and a second connection opening provided at the second end, a first connection terminal piece having an inner end portion electrically connected to an electrode of one of the battery cells arranged at one end of a serial connection of the battery cells and an outer end portion disposed inside the first connection opening, and a second connection terminal piece having an inner end portion electrically connected to an electrode of another one of the battery cells arranged at another end of the serial connection and an outer end portion disposed inside the second connection opening.

Other aspects and advantages of the invention will be apparent from the following description, the drawings and the claims.

DETAILED DESCRIPTION

An exemplary embodiment according to the present invention will be described below referring to the drawings.

Figure 1:
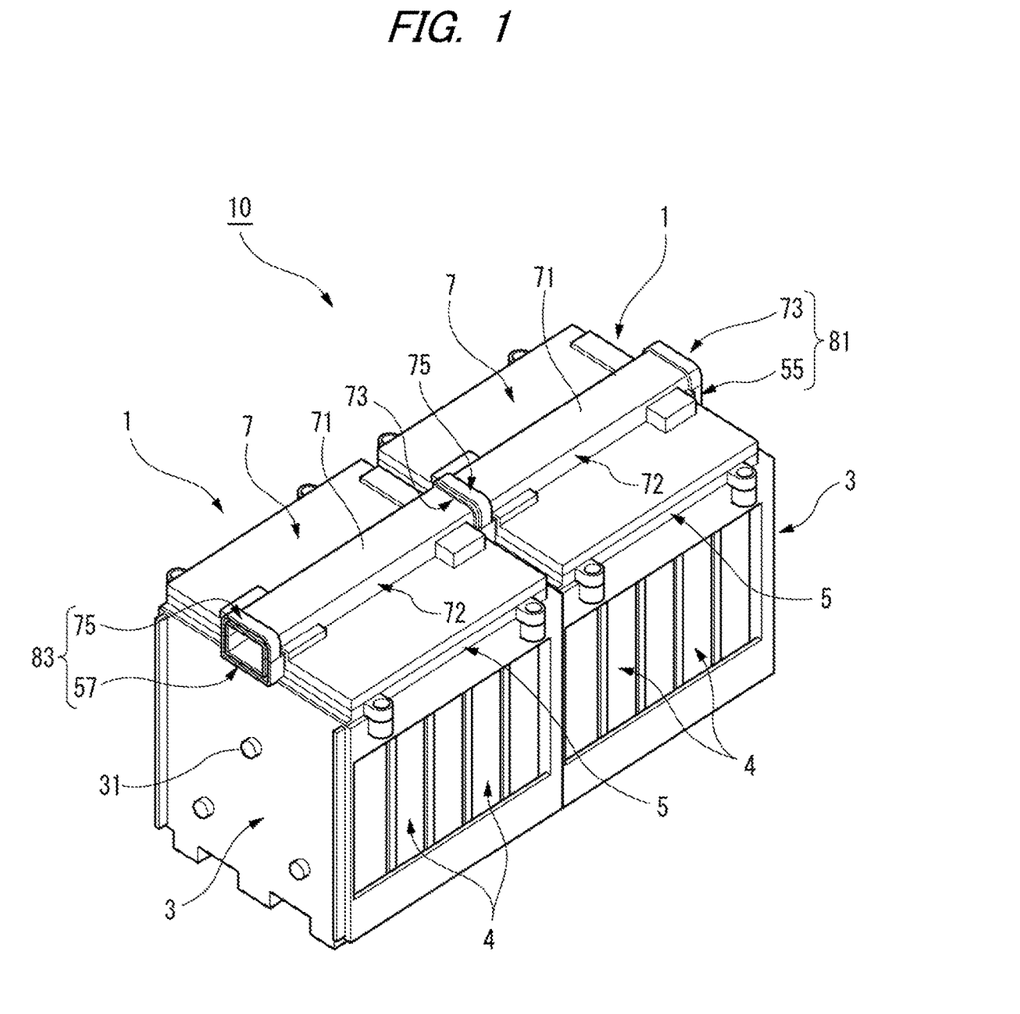
FIG. 1 is a perspective view of a battery pack according to an exemplary embodiment of the present invention.
Figure 2:
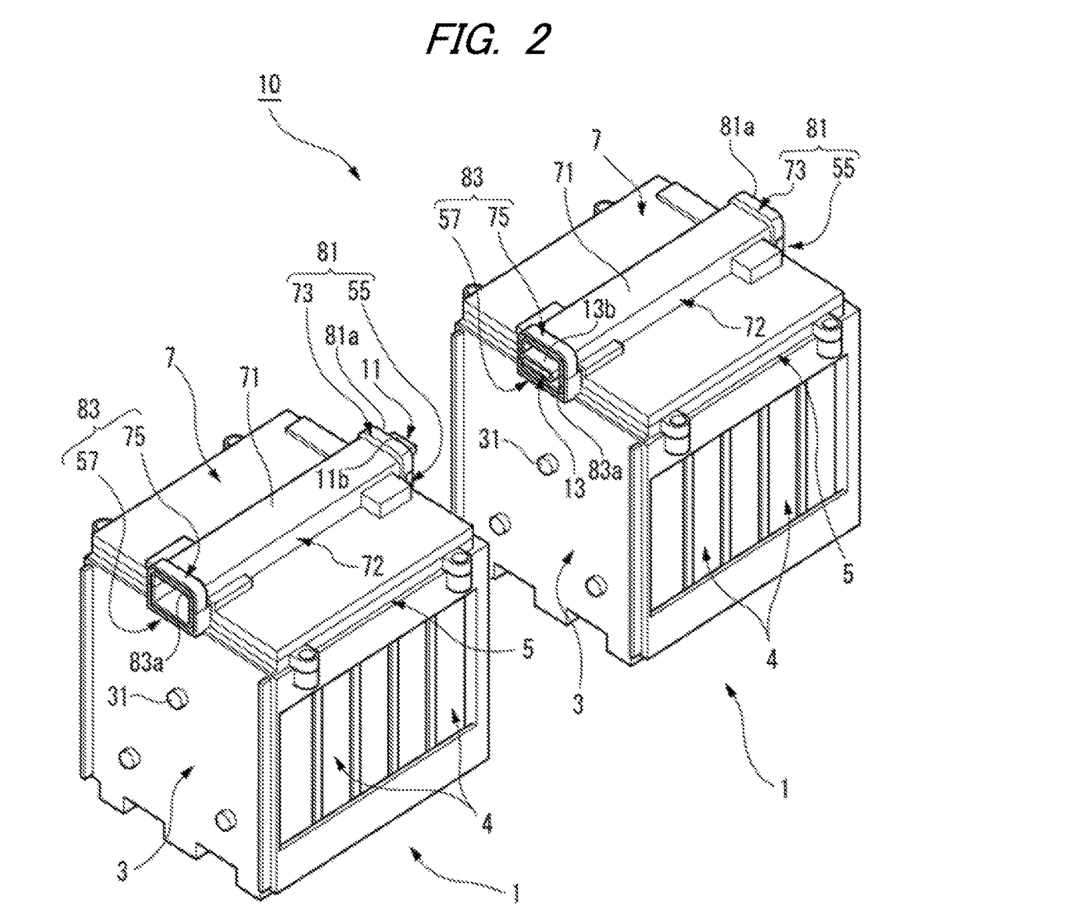
FIG. 2 is another perspective view of the battery pack with its battery modules being separated.
Figure 3:
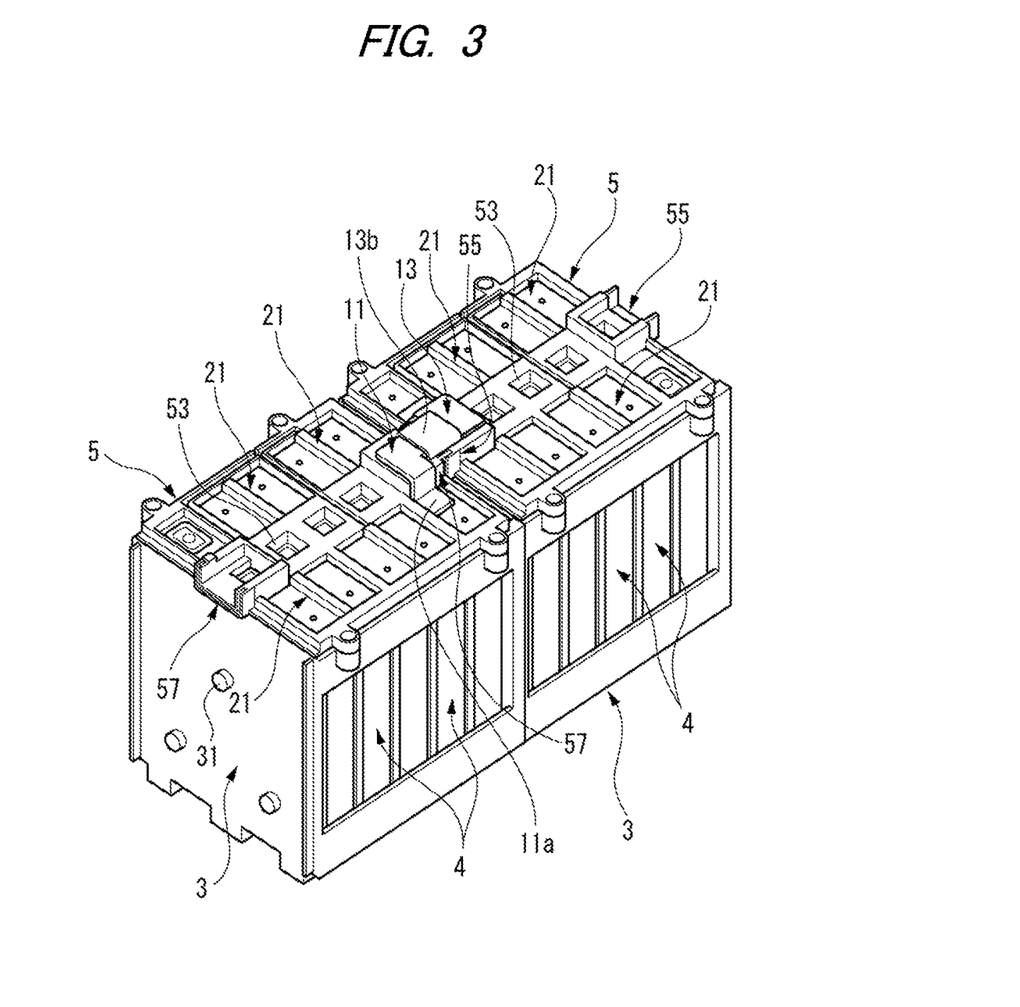
FIG. 3 is a perspective view of the battery modules with their insulation covers being removed.

As shown in FIGS. 1 to 3, a battery pack 10 according to an exemplary embodiment of the present invention has a plurality of battery modules 1 (two battery modules 1 in this example). However, the configuration of the battery pack according to the present invention is not limited to a configuration in which two battery modules are combined, and the present invention provides a battery pack in which the number of battery modules to be combined can be increased or decreased depending on a plurality of product variations (required electric power) by using a single battery module as the minimum unit module without adding new components.

Figure 4:
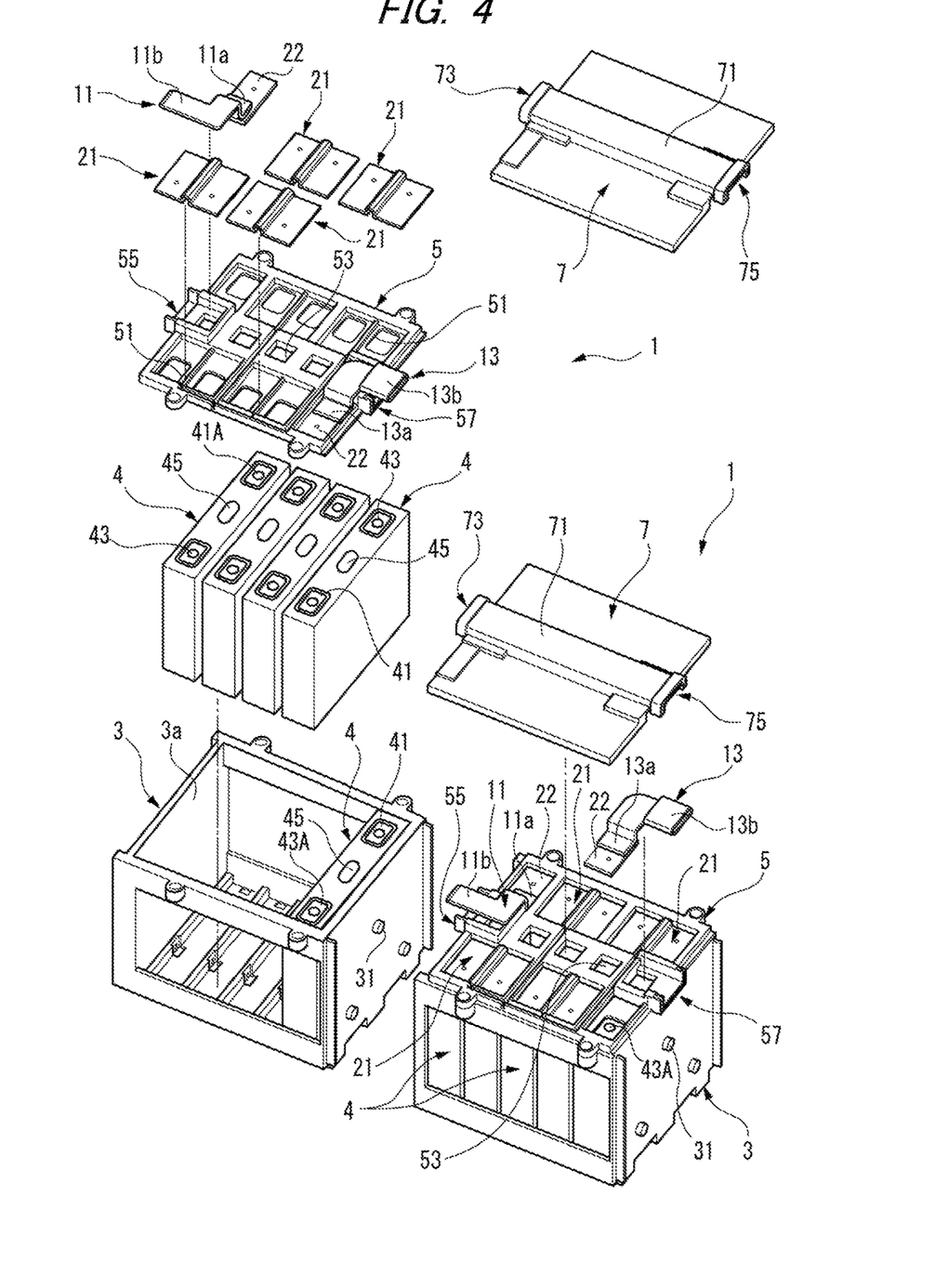
FIG. 4 is an exploded perspective view of the battery modules.

As shown in FIG. 4, the battery module 1 has a case 3 having an upper opening 3a to adjacently arrange a plurality of battery cells 4 inside the case 3, a plurality of bus bars 21 configured to electrically connect the electrodes of the adjacent battery cells 4, a bus bar case 5 attached to the upper opening 3a to hold a first connection terminal piece 11, a second connection terminal piece 13 and the plurality of bus bars 21; and an insulation cover 7 covering the upper face of the bus bar case 5.

The case 3 is made of, for example, a synthetic resin material and is formed into a rectangular parallelepiped box shape. The case 3 has the upper opening 3a so that at least the upper portion thereof is open. The inside of the case 3 communicating with the upper opening 3a serves as a battery cell accommodating space. In the battery cell accommodating space of the case 3, the plurality of battery cells 4 is accommodated so as to be adjacently arranged and secured by the bus bar case 5 attached to the upper opening 3a. On the outer faces of both the end walls of the case 3 in the longitudinal direction (the left-right direction in FIG. 4) thereof, a fitting protrusion 31 and a fitting recess section 33 protrude so that, when the cases 3 are combined with each other, the protrusion on one case 3 is fitted to the fitting recess section on the other case 3, whereby the cases 3 are positioned and secured to each other.

As shown in FIG. 4, the battery cells 4 (five in the illustrated example) are arranged in the horizontal direction. In this exemplary embodiment, each battery cell 4 has a substantially rectangular parallelepiped shape with a small lateral width. For example, secondary batteries, such as nickel-hydrogen batteries and lithium-ion batteries, can be used for the battery cells 4. The plurality of battery cells 4 is accommodated in the case 3 while being separated at predetermined intervals so that the longitudinal direction (the left-right direction in FIG. 4) of the case 3 becomes the lateral width directions of the battery cells.

The battery cells 4 are electrically connected to each other in series. More specifically, the bus bars 21 are disposed on the upper faces of the battery cells 4. The bus bar 21 electrically connects two adjacent battery cells 4 in the arrangement direction of the cells (in the left-right direction in FIG. 4) in series. The battery cells 4 are connected to a control circuit (not shown) at the end portions of the battery pack 10. The control circuit measures the voltage, current, temperature, etc. of each battery cell 4, determines the battery capacity, required charging/discharging amount, etc. of each battery cell 4, and carries out control for charging, discharging, etc.

A positive electrode terminal 41 and a negative electrode terminal 43, serving as a pair of flat electrodes, are provided at one end and the other end of the upper face of the battery cell 4. The positive electrode terminal 41 is electrically connected to the positive electrode plate (collector plate) of the power generation element inside the battery body. The negative electrode terminal 43 is electrically connected to the negative electrode plate (collector plate) of the power generation element inside the battery body. Furthermore, a relief valve 45 is provided on the upper face of the battery cell 4. The relief valve 45 is provided between the positive electrode terminal 41 and the negative electrode terminal 43 in the left-right direction of the battery cell 4. The relief valve 45 is used to discharge the gas generated in the inside of the battery cell 4 to the outside of the battery cell 4.

For example, if the battery cell 4 is overcharged, there is a possibility that gas may be generated mainly from the electrolyte thereof. As the gas is generated, the internal pressure of the battery cell 4 rises because the battery cell 4 is hermetically sealed. If the internal pressure of the battery cell 4 reaches the operating pressure of the relief valve 45, the relief valve 45 changes from its open state to its closed state, thereby being capable of discharging the gas to the outside of the battery cell 4.

The so-called self-destruction type valve or the so-called self-resetting type valve can be used as the relief valve 45. In the case of the self-destruction type valve, the relief valve 45 changes from its closed state to its open state irreversibly. The self-destruction type valve can be formed, for example, by engraving the upper face of the battery cell 4. On the other hand, in the case of the self-resetting type valve, the relief valve 45 changes between its closed state and its open state reversibly depending on the internal pressure of the battery cell 4. The self-resetting type valve can be configured, for example, by using a spring.

The bus bar case 5 is made of an insulating synthetic resin material and formed into a rectangular flat plate shape. The bus bar case 5 has a plurality of terminal openings 51 corresponding to the positive electrode terminals 41 and the negative electrode terminals 43 of the respective battery cells 4 accommodated in the case 3 and a plurality of gas discharge ports 53 corresponding to the relief valves 45. Case-side half-split sections 55, 57 respectively forming the connection openings 81, 83 of a gas discharge duct 72 are provided at portions adjacent to the respective gas discharge ports 53 at both ends of the bus bar case 5 in the longitudinal direction thereof (the left-right direction in FIG. 4).

The bus bar case 5 is secured with bolts to the case 3 so as to cover the upper opening 3a of the case 3 accommodating the battery cells 4.

At the central section of the rectangular conductive metal plate constituting the bus bar 21, a rib fitting section is formed by bending the plate. The bus bar 21 is placed on the bus bar case 5 so as to cover the two terminal openings 51 adjacent to each other in the arrangement direction of the cells and is electrically connected, for example, by welding, to the positive electrode terminal 41 and the negative electrode terminal 43 of the respective battery cells 4.

The first connection terminal piece 11 is a substantially L-shaped bus bar formed of a conductive metal plate. The first connection terminal piece 11 has an inner end portion 11a is electrically connected to a positive electrode 41A of the entire set of battery cells 4, for example, an electrode of one of the battery cells 4 arranged at one end of the serial connection of the battery cells 4 (the left end in FIG. 4), and an outer end portion 11b configured to be electrically connected to an end portion 13b of the second connection terminal piece 13 of the adjacent battery module 1.

The inner end portion 11a is electrically connected to the positive electrode 41A via a bus bar 22 by, for example, welding. The outer end portion 11b is configured as a male terminal.

When the first connection terminal piece 11 is placed on the bus bar case 5, the outer end portion 11b of the first connection terminal piece 11 is disposed above the case-side half-split sections 55 of the bus bar case 5.

The second connection terminal piece 13 is a substantially L-shaped bus bar formed of a conductive metal plate. The second connection terminal piece 13 has an inner end portion 13a electrically connected to a negative electrode 43A of the entire set of battery cells 4, for example, an electrode of another one of the battery cells 4 disposed at another end of the serial connection of the battery cells 4 (the right end in FIG. 4), and the outer end portion 13b configured to be electrically connected to the inner end portion 11a of the first connection terminal piece 11 of the adjacent battery module 1.

The inner end portion 13a is electrically connected to the negative electrode 43A via a bus bar 22 by, for example, welding. The outer end portion 13b is configured as a female terminal by, for example, bending.

When the second connection terminal piece 13 is placed on the bus bar case 5, the outer end portion 13b of the second connection terminal piece 13 is disposed above the case-side half-split sections 57 of the bus bar case 5.

The insulation cover 7 is made of an insulating synthetic resin material and formed into a rectangular flat plate shape. A gas discharge duct section 71 defining a discharge passage extending in the arrangement direction of the cells is formed at the central section of the insulation cover 7.

Figure 5:
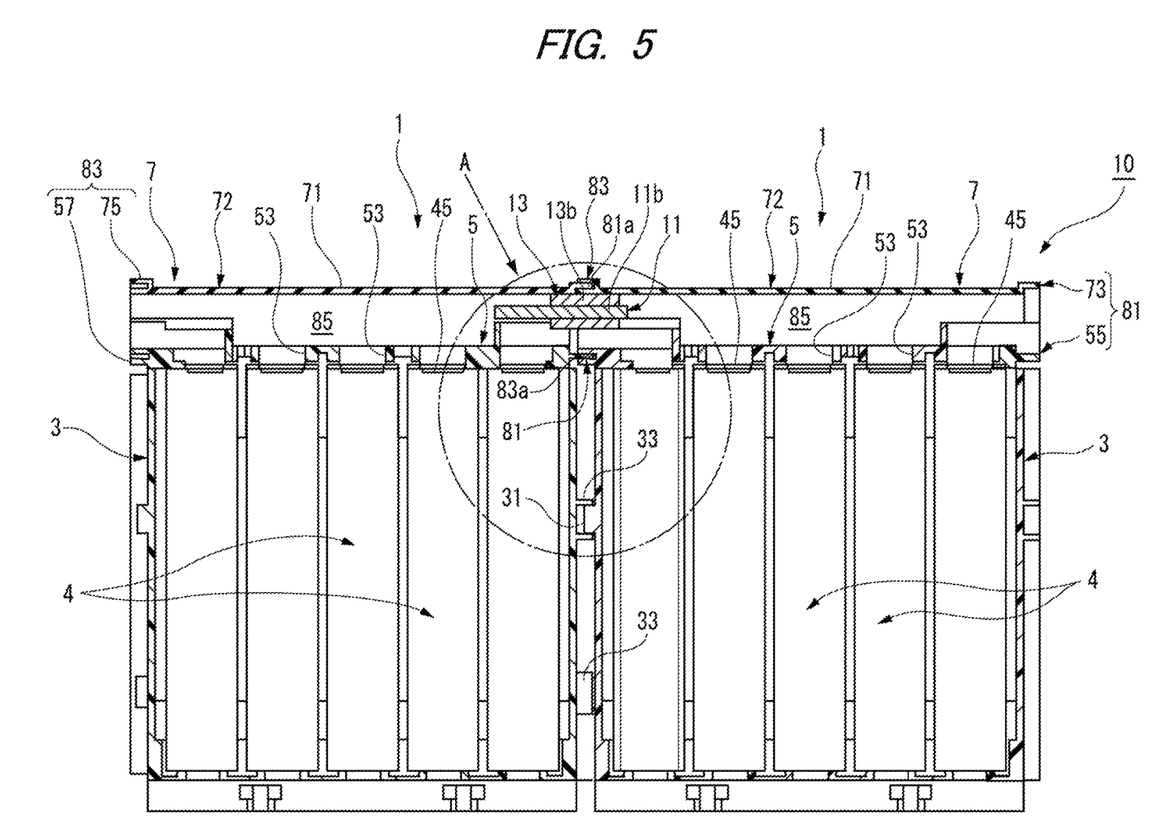
FIG. 5 is a longitudinal sectional view of the battery pack.
Figure 6:
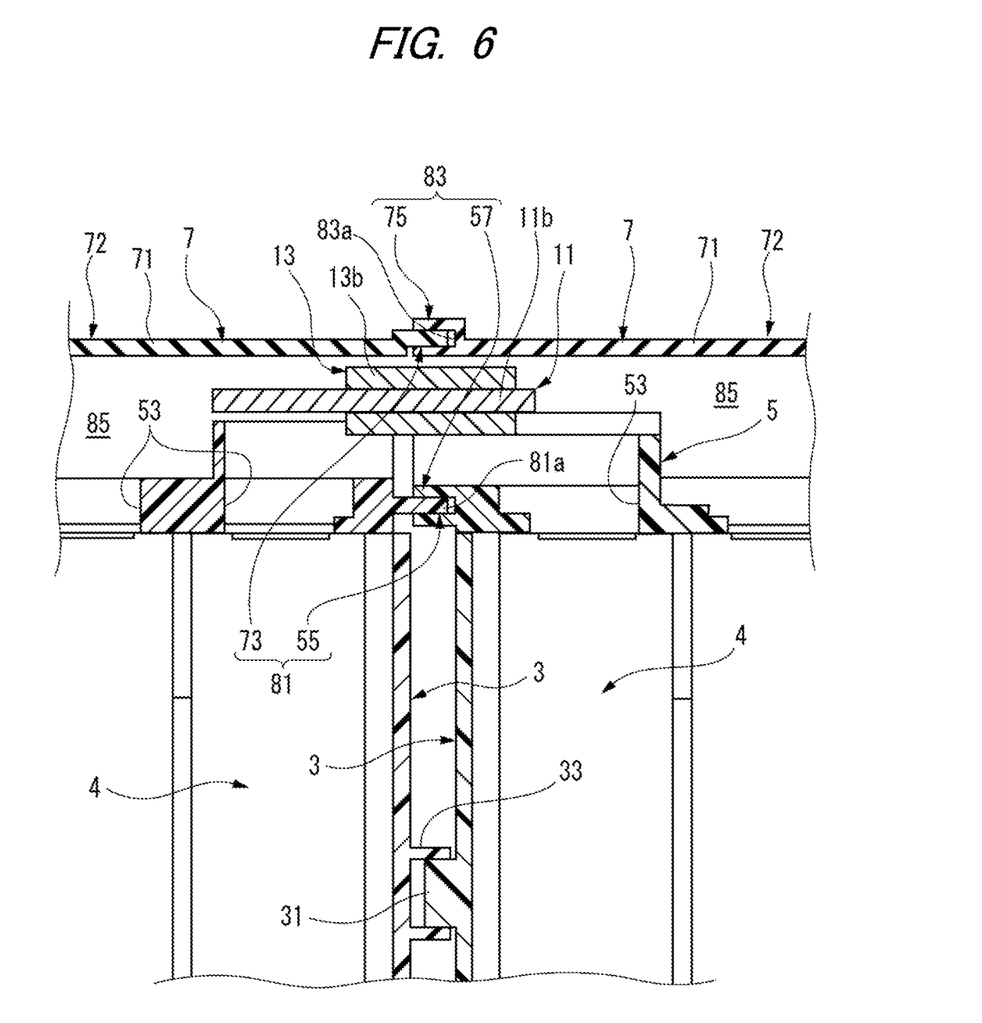
FIG. 6 is an enlarged view of the portion A in FIG. 5.

Hence, when the insulation cover 7 is attached to cover the upper face of the bus bar case 5 as shown in FIGS. 5 and 6, a gas discharge duct 72 defining a discharge passage 85 is configured by the upper face portion of the bus bar case 5 in which the gas discharge ports 53 are formed and the gas discharge duct section 71 of the insulation cover 7. This gas discharge duct 72 extends from a first end to a second end in the direction in which the battery cells 4 are arranged in the battery module 1 to guide the gas discharged from the relief valves 45 to the outside of the battery module 1, and the first connection opening 81 is disposed at the first end and the second connection opening 83 is disposed at the second end.

Cover-side half-split sections 73, 77 respectively forming the connection openings 81, 83 of the gas discharge duct 72 together with the case-side half-split sections 55, 57 of the bus bar case 5 are provided at both ends of the gas discharge duct section 71 in the longitudinal direction thereof (the left-right direction in FIG. 4).

Hence, when the insulation cover 7 is attached to cover the upper face of the bus bar case 5 as shown in FIGS. 2 and 6, the case-side half-split section 55 is combined with the cover-side half-split section 73 and the first connection opening 81 is formed, and the case-side half-split section 57 is combined with the cover-side half-split section 75 and the second connection opening 83 is formed.

As a result, as shown in FIG. 6, the outer end portion 11b of the first connection terminal piece 11 is positioned in the hollow portion of the first connection opening 81 corresponding thereto, and the outer end portion 13b of the second connection terminal piece 13 is positioned in the hollow portion of the second connection opening 83 corresponding thereto.

Furthermore, the first connection opening 81 has a ring-shaped opening edge 81a, and the second connection opening 83 has a ring-shaped fitting groove 83a to be fitted to the opening edge of the connection opening 81.

Next, advantageous effects of the battery pack 10 according to the foregoing exemplary embodiment will be described.

When combining the two battery modules 1, the connection openings 81, 83 of the gas discharge ducts 72 that are opposed to each other are connected to each other, and at the same time, the outer end portion 11b of the first connection terminal piece 11 of one of the battery module 1 and the outer end portion 13b of the second connection terminal piece 13 of the other battery module 1 are opposed to each other and are electrically connected to each other. Therefore, the battery modules 1 can be easily combined. Consequently, the battery pack 10 can be obtained by simply securing the cases 3 to each other.

The outer end portion 11b of the first connection terminal piece 11 is disposed inside the first connection opening 81 of the gas discharge duct 72, and the outer end portion 13b of the second connection terminal piece 13 is disposed inside the second connection opening 83 of the gas discharge duct 72. Hence, the gas discharge ducts 72 are not required to circumvent the electric connection portions of the first connection terminal piece 11 and the second connection terminal piece 13 and can be connected through the shortest route, whereby the increase in the sizes of components can be suppressed. In addition, since the outer end portions 11b, 13b of the first connection terminal piece 11 and the second connection terminal piece 13 are covered with the gas discharge ducts 72, insulating and finger-touch preventing members, such as connector housings, are not required.

The gas discharge duct 72 is formed by combining the insulation cover 7 and the bus bar case 5 that holds the first connection terminal piece 11 and the second connection terminal piece 13. Hence, the outer end portions 11b, 13b of the first connection terminal piece 11 and the second connection terminal piece 13 can be disposed easily inside the connection openings 81, 83 of the gas discharge duct 72, respectively, by simply assembling the bus bar case 5 and the insulation cover 7.

Furthermore, the first connection opening 81 has the ring-shaped opening edge 81a, and the second connection opening 83 has the ring-shaped fitting groove 83a to be fitted to the opening edge 81a. Moreover, the outer end portion 11b of the first connection terminal piece 11 is configured as the male terminal, and the outer end portion 13b of the second connection terminal piece 13 is configured as the female terminal to be fitted to the male terminal Hence, when combining the battery modules 1, the connection of the gas discharge ducts 72 and the connection of the first connection terminal piece 11 and the second connection terminal piece 13 can be carried out easily by simply butting the connection openings 81, 83 of the gas discharge ducts 72 being opposed to each other against each other, by simply butting the outer end portions 11b, 13b of the first connection terminal piece 11 and the second connection terminal piece 13 being opposed to each other against each other, and by simply moving the battery modules 1 in directions so as to become closer to each other.

Advantages of the battery pack 10 according to the exemplary embodiment will be further described with reference to a battery pack 100 according to a reference example shown in FIG. 7. Components similar to those of the battery pack 10 according to the foregoing exemplary embodiment are designated by the same reference signs and their detailed descriptions will be omitted.

Figure 7:
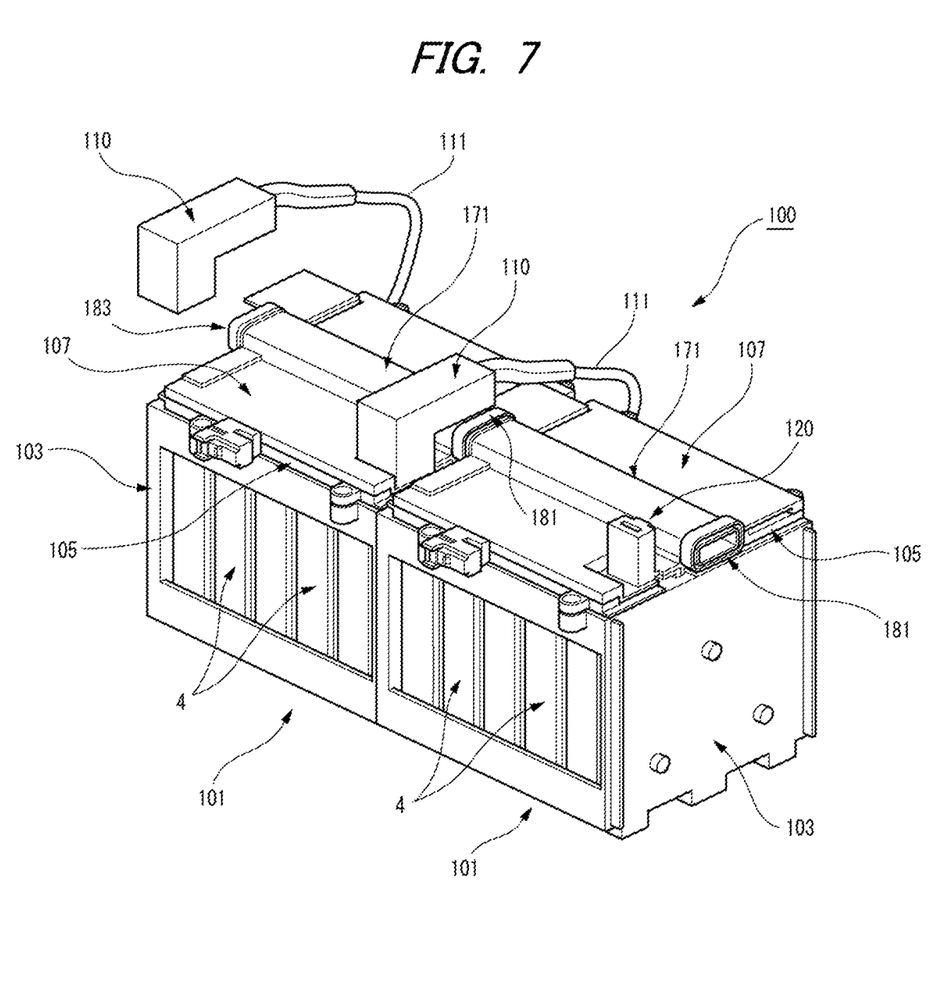
FIG. 7 is a perspective view of a battery pack according to a reference example.

The battery pack 100 shown in FIG. 7 is a combination of two battery modules 101.

The battery module 101 has a case 103 configured to adjacently arrange a plurality of battery cells 4 inside the case 103, a plurality of bus bars 21 configured to electrically connect the electrodes of the adjacently arranged battery cells 4, a bus bar case 105 attached to the upper opening of the case 103 to hold the plurality of bus bars 21, and an insulation cover 107 covering the upper face of the bus bar case 105.

A male connector 110 is connected to one end of an electric wire 111, and the other end of the electric wire 111 is connected to a positive electrode 41A of the entire set of battery cells 4 accommodated in the case 103. The female terminal (not shown) accommodated in the female connector section 120 provided on the bus bar case 105 is connected to a negative electrode 43A of the entire set of battery cells 4.

A gas discharge duct section 171 defining a discharge passage extending in the arrangement direction of the cells is formed at the central area of the insulation cover 107. Connection openings 181, 183 capable of being fitted and connected to each other are formed at both ends of the gas discharge ducts 171.

Hence, in the battery pack 100, when the two battery modules 101 of the battery pack 100 are combined with each other, the connection openings 181 and 183 of the gas discharge ducts 171 opposed to each other are connected to each other so that the cases 103 are secured to each other, and then the male connector 110 of one battery module 101 is fitted to the female connector section 120 of the other battery module 101, whereby the two battery modules 101 can be electrically connected to each other.

However, since the gas discharge ducts 171 are provided at the central area of the insulation covers 107 so that the discharge passage becomes shortest, the electric wire 111 for connecting the positive electrode 41A of the one battery module 101 to the negative electrode 43A of the other battery module 101 is required to circumvent the gas discharge ducts 171, and the male connector 110 and the female connector 120 are also required additionally, whereby the battery pack 100 becomes large in size.

On the other hand, in the battery module 1 of the battery pack 10 according to this exemplary embodiment, since the electric connection end portion 11b of the first connection terminal piece 11 is disposed inside the connection opening 81 of the gas discharge duct 72 and the electric connection end portion 13b of the second connection terminal piece 13 is disposed inside the connection opening 83 of the gas discharge duct 72 as described above, the gas discharge ducts 72 are not required to circumvent the electric connection portion of the first connection terminal piece 11 and the second connection terminal piece 13 and can be connected through the shortest route. Consequently, the increase in the sizes of components can be suppressed.

Furthermore, since the outer end portions 11b, 13b of the first connection terminal piece 11 of the second connection terminal piece 13 are covered with the gas discharge ducts 72 in the battery pack 10 according to this exemplary embodiment, insulating and finger-touch preventing members, such as connector housings, are not required.

While the present invention has been described with reference to certain exemplary embodiments thereof, the scope of the present invention is not limited to the exemplary embodiments described above, and it will be understood by those skilled in the art that various changes and modifications may be made therein without departing from the scope of the present invention as defined by the appended claims.

For example, the electrodes may not be flat electrodes but instead may be electrode posts. The electrodes and the bus bars 21, 22 may be connected by, for example, screw fastening or the like, instead of welding.

With the battery pack 10 described above, the battery modules 1 can be connected easily so that manufacturing cost can be reduced.

According to one or more exemplary embodiments of the present invention, a battery pack (10) includes a combination of a plurality of battery modules (1). Each of the battery modules (1) includes a stack of battery cells (4) each having a relief valve (45), a gas discharge duct (72) extending from a first end of the gas charge duct (72) to a second end of the gas discharge duct (72) in a direction in which the battery cells (4) are arranged in the battery module (1) to guide gas discharged from the relief valve (45) of each battery cell (4) to an outside of the battery module (1), the gas discharge duct (72) having a first connection opening (81) provided at the first end and a second connection opening (83) provided at the second end, a first connection terminal piece (11) having an inner end portion (11a) electrically connected to an electrode (a positive electrode 41A) of one of the battery cells (4) arranged at one end of a serial connection of the battery cells (4) and an outer end portion (11b) disposed inside the first connection opening (81), and a second connection terminal piece (13) having an inner end portion (13a) electrically connected to an electrode (a negative electrode 43A) of another one of the battery cells (4) arranged at another end of the serial connection and an outer end portion (13b) disposed inside the second connection opening (83).

Each of the battery modules (1) may further include a case (3) having an upper opening (3a) to adjacently arrange the battery cells (4) inside the case (3), a plurality of bus bars (21) configured to electrically connect electrodes (41, 43) of adjacent ones of the battery cells (4), a bus bar case (5) attached to the upper opening (3a) to hold the first connection terminal piece (11), the second connection terminal piece (13) and the plurality of bus bars (21), and an insulation cover (7) covering an upper face of the bus bar case (5). The bus bar case (5) and the insulation cover (7) may define a discharge passage (85) of the gas discharge duct (72) between the bus bar case (5) and the insulation cover (7).

The first connection opening (81) may have a ring-shaped opening edge (81a) and the second connection opening (83) may have a ring-shaped fitting groove (83a) adapted to be fitted to the opening edge (81a). The outer end portion (11b) of the first connection terminal piece (11) may be configured as a male terminal, and the outer end portion (13b) of the second connection terminal piece (13) may be configured as a female terminal adapted to be fitted to the male terminal.

What is claimed is:

1. A battery pack comprising a combination of a plurality of battery modules, wherein each of the battery modules comprises:
   a stack of battery cells, each of the battery cells having a relief valve;
   a gas discharge duct extending from a first end of the gas discharge duct to a second end of the gas discharge duct in a direction in which the battery cells are arranged in the battery module to guide gas discharged from the relief valve of each battery cell to an outside of the battery module, the gas discharge duct having a first connection opening provided at the first end and a second connection opening provided at the second end;

a first connection terminal piece having an inner end portion electrically connected to an electrode of one of the battery cells arranged at one end of a serial connection of the battery cells and an outer end portion disposed inside the first connection opening; and a second connection terminal piece having an inner end portion electrically connected to an electrode of another one of the battery cells arranged at another end of the serial connection and an outer end portion disposed inside the second connection opening.

2. The battery pack according to claim 1, wherein each of the battery modules further comprises:

a case having an upper opening to adjacently arrange the battery cells inside the case;

a plurality of bus bars configured to electrically connect electrodes of adjacent ones of the battery cells;

a bus bar case attached to the upper opening to hold the first connection terminal piece, the second connection terminal piece and the plurality of bus bars; and an insulation cover covering an upper face of the bus bar case, and wherein the bus bar case and the insulation cover define a discharge passage of the gas discharge duct between the bus bar case and the insulation cover.

3. The battery pack according to claim 1, wherein the first connection opening has a ring-shaped opening edge and the second connection opening has a ring-shaped fitting groove adapted to be fitted to the opening edge, and wherein the outer end portion of the first connection terminal piece is configured as a male terminal, and the outer end portion of the second connection terminal piece is configured as a female terminal adapted to be fitted to the male terminal.

* * * * *